Aug. 9, 1938.    R. ERBAN    2,125,998
TORQUE LOADING DEVICE FOR ADHESIVE TRANSMISSION
Filed Jan. 23, 1936
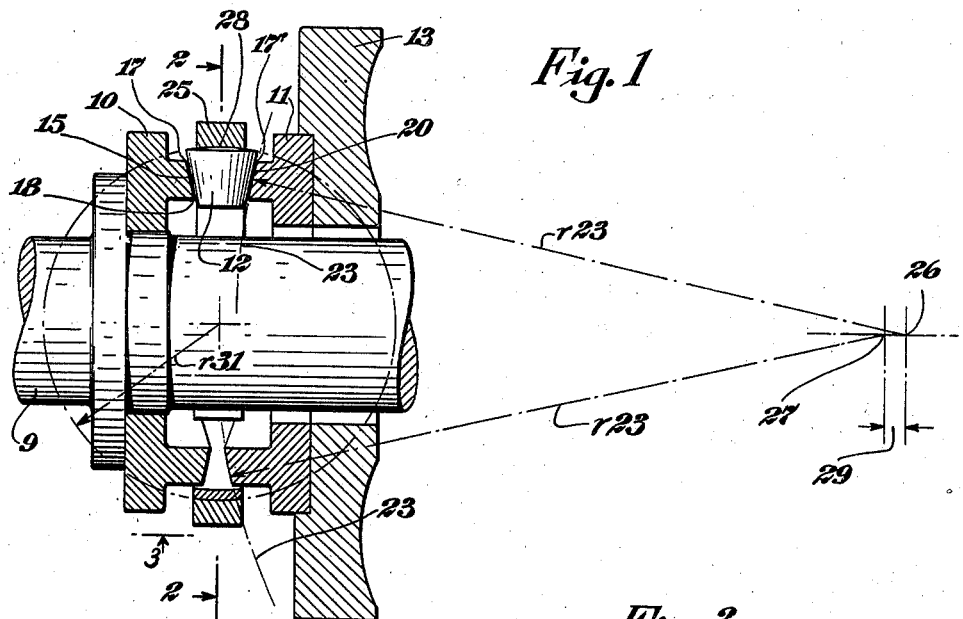
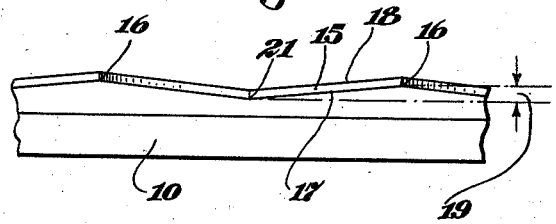
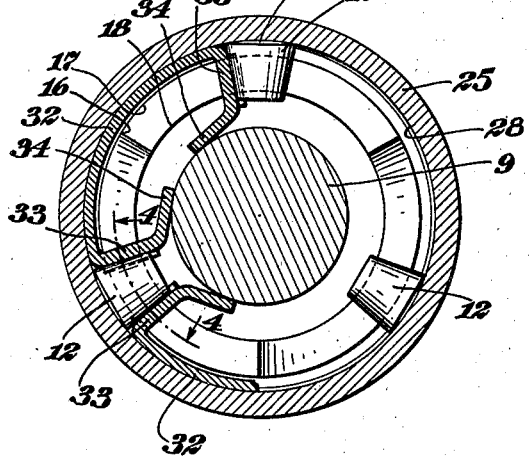
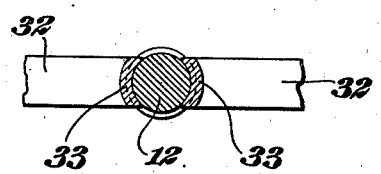
INVENTOR,
Richard Erban,
BY
ATTORNEY.

Patented Aug. 9, 1938

2,125,998

UNITED STATES PATENT OFFICE 2,125,998

TORQUE LOADING DEVICE FOR ADHESIVE TRANSMISSION

Richard Erban, New York, N. Y., assignor to Erban Patents Corporation, New York, N. Y., a corporation of New York Application January 23, 1936, Serial No. 60,410

12 Claims. (Cl. 74—208)

My present invention relates generally to transmissions of the adhesive type wherein the torque is transmitted through the adhesive contact between races and rolling bodies.

One of the objects of my invention is the provision of a new and improved torque loading arrangement for developing and applying to the system that axial component required to maintain the system operative under varying load conditions.

Another object of my invention is the provision of a new and improved arrangement for allowing for a universal movement between the elements of the torque loading system.

A further object of my invention is the provision of a new and improved arrangement in a torque loading system for equalizing the distribution of the torque, between the rolling bodies which form elements thereof.

It is the general object of my invention to provide a new and improved torque loading arrangement which is more efficient than those hitherto employed, that requires fewer parts and that can be manufactured more economically.

For the attainment of these objects and such other objects as may hereinafter appear or be pointed out, I have illustrated in the drawing one embodiment of my invention wherein:—

Fig. 1 is a longitudinal section through the axis of my torque loading arrangement;

Fig. 2 is a cross section taken on lines 2—2 of Fig. 1 looking in the direction of the arrows;

Fig. 3 is a developed view of a detail on an enlarged scale looking in the direction of the arrow marked 3 in Fig. 1; and Fig. 4 is a cylindrical section through 4—4 looking in the direction of the arrows in Fig. 2.

In the embodiment illustrated in the drawing, I have shown a torque loading device and one of the races of the system mounted coaxially with and about the shaft 9 which will be assumed for the purposes of this disclosure to be the input shaft. It will be understood, however, that it is not necessary that the torque loading arrangement or the race be related to the shaft as herein shown or that the drive through the torque loading device be direct from the shaft.

The torque loading system comprises the two torque loading members 10 and 11 between which are received the rolling bodies 12. While the torque loading member 11 is shown as being made separately from the race 13 and fixed thereto, it will be understood that it could be made of one piece with the race or could be made of a separate piece and that the drive between the race and the member 11 could be effected through intermediate mechanisms. In fact my invention contemplates that the torque may be transmitted from either of the members 10 or 11 through any of the elements of the transmission.

The torque loading member 10 is shown as mounted upon the shaft 9 so as to rotate therewith by any preferred or desired arrangement as, for example, by being keyed thereto. The member 10 is provided with a surface of contact 15 which is shown as convexly curved preferably so as to be generally helically shaped, it being understood that the pitch or angle of the helix need not be constant throughout the entire surface.

The incline character of the contact surface 15 can be clearly seen from Fig. 3 which is a cylindrical view of the member 10 from the outside in the direction of the arrow 3 (Fig. 1) and flattened out into the plane of the drawing paper. If the angle of inclination is constant, as it is shown in Fig. 3, then the surface 15 will be a helical surface of constant pitch and its two edges 17 and 18 will be regular helical lines. Since the torque loading device is intended to work similarly in both directions, the operating surface 15 will extend symmetrically to both sides from the deepest point 21 and it will reach its highest ridge at the point 16 which is located at a 60° angle from the lowest point 21 to both sides thereof. The difference in height between the points 16 and 21 is the length of the axial movement that will be imparted to the roller 12 if it rolls over an arc of 60° upon the member 10. Since the two edges 17 and 18 are helical lines, the surface 15 can also be generated by having a slightly curved line of generally radial direction (of adequate shape) sliding along the edges 17 and 18 thereby describing a surface of the desired character.

The rolling bodies 12 are illustrated as having straight conical surfaces; however it is obvious that their surfaces could be slightly curved, convex or concave in profile, without altering the result in a substantial way. Therefore, the rolling bodies are referred to as being of generally conoidal shape, and it will be stated here that this term is intended to cover a rotational surface generated in the same way as the surface of a straight circular cone, but using as a generatrix a curve instead of a straight line.

This generatrix may then generally be referred to as a curve, which, in the case of a straight line, has the curvature zero.

The other torque loading member 11 is also provided with a surface of contact 20 which, in its preferred form, is convexly curved and for reasons that will hereinafter be pointed out is so contoured as to present a radial profile which is circular and preferably with its center in the axis of the torque loading system.

In Fig. 1, the circular profile is indicated at 23 and its radius is marked $r_{23}$, the center of it lying in the geometrical axis of the member 11. It is obvious that if the radius $r_{23}$ is kept constant and the arc 23 slides along the edge 17, that in such case the arc 23 will be moved axially parallel to itself and therefore the center of the respective circle will move from the position 26 to the position 27. The axial length for which the center of the circular profile will be moved and which is marked 29 in Fig. 1 will be equal to the climb of the edge 17 beween its highest and lowest point and which has been marked 19 in Fig. 3.

The curved profile 23 is so located with respect to the surfaces of the cones 12, that it will contact the generatrix thereof in a point situated at the middle of the cone. It will be observed, that the curvatures of the surface of the conoidal body 12 and of the surface 15 taken in a radial plane differ only slightly from each other.

A radial plane (with respect to the geometrical axis of the members 10 and 11, which is also the axis of the shaft 9) contains the axis of rotation of the cone 12 and the intersection of this plane with the surface of the cone is the generatrix of the cone, which in the present case is a curve with the curvature zero, that is, a straight line. The same radial plane intersects the contact surface of each of the members 10 or 11 in a line which is its radial profile; in Figure 1 this is shown as a circle (23) with a relatively great radius ($r_{23}$). The curvatures of these two surfaces, in a plane containing the radius $r_{23}$ and perpendicular to the above radial plane, are very different, the curvature of the cone being roughly, for the particular embodiment illustrated, that of its transverse cross section at the point of contact, which is a circle with a comparatively small radius (see cross section of cone 12 in Figure 4), while the curvature of the surface 15 is zero for all practical purposes, being part of a helical line intermediate the lines 17 or 18 of Figure 3.

It follows therefrom that the contact between these two surfaces, which is a point as long as they are brought into contact without a load, will develop into an elongated physical point or elliptical contact area as soon as the load is applied. The major axis of this elliptical area will lie in that direction in which the curvatures of the two contact surfaces are most alike, that is it will lie in the aforesaid radial plane or in the direction of the generatrix of the cone 12. The minor axis of the ellipse will lie perpendicular thereto, in the aforementioned plane perpendicular to the radial plane.

This elongated point or elliptical contact provides a much greater contact area than a true or "circular" point contact, such as exists between a ball and a flat surface (or a substantially flat surface), and therefore the load carrying capacity of the elliptical contact is a multiple of that of a true point contact. Yet at the same time, the elliptical contact permits a slight angling or rocking movement of the member 11 relatively to the member 10, without affecting the size or nature of the contacting area (that is of the elliptical area which represents the contact under load). For instance, if the member 11 should move slightly downward, that is, make a rocking movement about the center 26 in a counter-clockwise direction, it will be seen from an inspection of Figure 1 that the theoretical contact point (that is the no-load contact between the body 12 and the surface 15) between the circle 23 and the straight generatrix on the conoid 12 will not change its position with respect to the conoid 12. If it was in the middle thereof before the rocking of the member 11 took place, it will remain there. Since this theoretical contact point becomes the center of the contact ellipse which is formed under load, it follows that the position of this ellipse with respect to the conoid 12 remains likewise unchanged. It follows further that because of this unchanged position of the ellipse, the curvatures of the contacting surfaces, taken in planes through the center of the ellipse, also remain unchanged, and that therefore the contacting area (that is the size of the ellipse) will be the same as before. In other words, the load carrying capacity of the device remains unimpaired by a rocking movement of the member 11 relatively to the member 10.

This is an important feature of my torque loading device, and one which will be obtained, substantially unaltered, even if the rocking movement of the member 11 is other than around the center 26. For instance, if the center of such rocking movement should move slightly laterally of the axis of the device, it will be found that the position of the contact area will be altered only very slightly, while the curvatures of the two contacting surfaces, which determine the size of this area, will remain practically unchanged, so that the load carrying capacity is again maintained under all possible conditions.

Preferably the dimensions of the conoids 12 and the curvatures of their generatrices, as well as the curvatures of the radial profiles of the surfaces 15 and 20 are so selected with respect to the axial load to be carried by the device, that the major axis of the contact ellipse will always be shorter than the radial width of the surfaces, 15 or 20. These dimensions relating to the contact area can be predetermined with sufficient accuracy through the well known formulae of Hertz in their application to ball and roller bearing practice.

The contact relationship between the conical surface of the rolling bodies and the circular profile of the torque ring 11 permits the torque ring 11 to have a universal adjustment and this torque ring 11 is so mounted on the shaft as to permit of such universal adjustment.

It will further be observed that the contours provided on the two torque loading members 10 and 11 and the rolling bodies 12 are such that any unequal distribution of the load will tend to cause that rolling body which carries the larger load to be squeezed radially outwardly and my invention further contemplates taking advantage of this fact to automatically cause a redistribution of the load between the rolling bodies and this is accomplished in the illustrated embodiment by providing the ring 25 with an inner surface 26 so related to the extreme outer ends of the rolling bodies 12 that any radial outward movement of one of the rolling bodies will so affect the ring as to cause the ring to move so as to apply pressure to the other rolling bodies and to force them inwardly so as to cause them to carry an added part of the load. The action will be such that a point of stabilization will be reached in the equal distribution of the load between the three rolling bodies.

It will be noted that the radial movement of the rolling bodies which has just been described as taking place for the purpose of distributing equal loads among them, will also cause a slight angling or rocking movement between the members 10 and 11. This becomes clear if it is considered that the rolling body or conoid which moves outwardly acts like a wedge that is being withdrawn, thus permitting the two members 10 and 11 to come slightly closer together, while the rolling bodies which are pushed inwardly act like so many wedges pushed in between, thus forcing the two members 10 and 11 slightly more apart, and thereby taking over a greater part of the total load.

Again it is an important feature of my invention that this slight rocking movement, due to equalization movements of the rolling bodies, will not interfere in any way with the operation of the device or with its load carrying capacity, as has been shown herein above, and that my device will therefore maintain its great load carrying capacity under all operating conditions.

It will be observed that my device is self-equalizing as to the distribution of load (and torque) between all of the rolling bodies, by either of the described movements of adjustment, or some combination thereof. It will be further observed that either of these results is accomplished through a combination of several provisions, one of which consists in the arrangement of the surface of each of the rolling bodies with respect to the contacting surface of at least one of the torque loading members in such relation, that the contact between these two surfaces will be at a point in which a tangent drawn to the generatrix of the rolling body is inclined with respect to the axis of rotation of that rolling body.

From inspection of Figs. 1 and 2 it will be observed that the inner surface 28 of the ring 25 is spherical with a radius marked $r_{31}$ and that the rollers 12 have at their extreme outer end surface 14 spherically contoured and of same radius $r_{31}$ as the spherical inner surface 28 of the ring 25. The coaction of the surfaces 15 and 20 of the two members 10 and 11 in their tendency to move the rollers 12 radially outwardly, and the coaction of spherical surfaces 14 of the rollers against the spherical surface 28 of the ring 25 will cause each roller 12 to assume a position in which its geometrical axis is accurately radial and therefore intersects the geometrical axis of the two members 10 and 11. The roller can roll freely and without resistance only as long as this position is maintained and for this reason the automatic action of the surfaces 15 and 20 in cooperation with the surfaces 14 and 26 becomes highly important because they will not only maintain the roller in the correct position, but also restore it to that position if it should have become diverted from it for any reason whatsoever.

It has been shown that the arrangement so far described will automatically adjust the rollers to their right position if an axial load is acting between the members 10, 11 and the rollers 12. However, it is necessary with devices of this kind to insure a proper location of the different parts also in case they are relieved from load and that the parts can move freely toward each other. Conditions of this kind may occur even when the device is apparently loaded but when the load is oscillating or vibrating, such character of load will cause interruption of the contact between the rollers 12 and the surfaces 15 and 20. To provide for a proper location of the rollers 12 with respect to the ring 25 and of this ring 25 with respect to the shaft, spacer members are provided generally as shown at 32 in Fig. 2, between each two of the rollers 12. In Fig. 2 only the left half shows these spacer members. The central part of the spacer member is so shaped as to closely conform to the inner surface 26 of the ring 25. At both ends thereof the spacer has a portion 33 which is curved so as to partly enclose the surface of the roller 12.

The outermost end of the part 33 is so shaped that it will bear yieldingly against the shaft 9 with its part 34. Fig. 4 shows a section along the line 4—4 as indicated in Fig. 2 and illustrates the way in which the portion 33 of the spacers 32 hold the roller 12 in position and prevent them from following sideways out of the ring 25. From inspection of Fig. 2 it becomes apparent that the spacers 32 will not only keep the rollers 12 at a proper distance from each other and also in a perfectly radial position by forcing them outwardly against the spherical surface 26, but that they also will serve to yieldingly center the ring 25 upon the shaft 9 so that the entire system may be pretty close to its balanced position even before a load is applied so that upon application of load, there will be only very small adjusting movements in order to correct the position of the ring 25 and the rollers 12.

Having thus described my invention and illustrated its use, what I claim as new and desire to secure by Letters Patent is:—

1. A torque loading device for a friction transmission system, comprising two coaxial torque loading members movable relatively to each other and each being provided with a contact surface, a floating mounting for at least one of said members permitting it to move transversely of its axis, rolling bodies interposed between said contact surfaces and cooperating therewith, each of said rolling bodies being of generally conoidal shape and having a generatrix of substantially less curvature than the curvature of any of its circular cross sections, and the said contact surface of said floatingly mounted member being curved to contact each of said rolling bodies at only one point at which a tangent to the generatrix of the rolling body is inclined with respect to its axis of rotation, the curvature of the radial profile of said last-named contact surface at its contact point with said rolling body being distinctly different from but closely related to the curvature of the generatrix of the said rolling body at that same point, so as to produce an elliptical contact area between the rolling body and the said contact surface when they are pressed together.

2. A torque loading device for a friction transmission system, comprising two coaxial torque loading members movable relatively to each other and each being provided with a contact surface, rolling bodies interposed between said contact surfaces and cooperating therewith, each of said rolling bodies being of generally conoidal shape and having a generatrix of substantially less curvature than the curvature of any of its circular cross-sections, and at least one of the said contact surfaces being curved to contact each of said rolling bodies only at one point at which a tangent to the generatrix of the rolling body is inclined with respect to its axis of rotation, and means for balancing the thrusts in the directions of the axes of rotation of the rolling bodies, said means comprising a free floating element common to all rolling bodies.

3. A torque loading device for a friction transmission system, comprising two coaxial torque loading members movable relatively to each other and each being provided with a contact surface, rolling bodies interposed between said contact surfaces and cooperating therewith, each of said rolling bodies being of generally conoidal shape and having a generatrix of substantially less curvature than the curvature of any of its circular cross-sections, and at least one of the said contact surfaces being curved to contact each of said rolling bodies only at one point at which a tangent to the generatrix of the rolling body is inclined with respect to its axis of rotation, and equalizing means for the distribution of load and torque between the rolling bodies, said means comprising a free floating ring surrounding all of the rolling bodies.

4. A torque loading device for a friction transmission system, comprising two coaxial torque loading members movable relatively to each other and each being provided with a contact surface, rolling bodies interposed between said contact surfaces and cooperating therewith, each of said rolling bodies being of generally conoidal shape and having a generatrix of substantially less curvature than the curvature of any of its circular cross-sections, and at least one of the said contact surfaces being curved to contact each of said rolling bodies at only one point at which a tangent to the generatrix of the rolling body is inclined with respect to its axis of rotation, each of the said rolling bodies having at one end thereof part of a spherical surface having its center upon the axis of the torque loading members, and a free floating element provided with part of a spherical surface which contacts each of the above said spherical surfaces of the rolling bodies.

5. A torque loading device for a friction transmission system, comprising two coaxial torque loading members movable relatively to each other and each being provided with a contact surface, a floating mounting for at least one of said members permitting it to move transversely of its axis, rolling bodies interposed between said contact surfaces and cooperating therewith, each of said rolling bodies being of generally conoidal shape and having a generatrix of substantially less curvature than the curvature of any of its circular cross-sections, means for equalizing the distribution of load and torque between all of the rolling bodies, said means including a member contacting the said rolling bodies and capable of free floating movements within predetermined limits transversely to the axis of the torque loading device, and elastic yieldable means for maintaining the floating member in approximate alignment during periods of no-load.

6. A torque loading device for a friction transmission system, comprising two coaxial torque loading members movable relatively to each other and each being provided with a curved contact surface, rolling bodies interposed between said contact surfaces and cooperating therewith, each of said rolling bodies being of generally conoidal shape and having a generatrix of substantially less curvature than the curvature of any of its circular cross-sections, and slightly different from the curvature of the radial profile of one of the said cooperating contact surfaces, and means automatically operative upon a movement of one of the rolling bodies radially outward for causing the other rolling bodies to move radially inward and vice versa.

7. A torque loading device for a friction transmission, comprising two coaxial torque loading members movable relatively to each other, conoidal shaped rollers interposed between said members, at least one of said members having helical surfaces contacting each of said conoidal rollers in elliptical contact areas that are inclined with respect to the axis of rotation of each of said rollers whereby each of said rollers individually sustains a thrust in the direction of said axis in proportion to the torque transmitted by the individual roller, and means to sustain said thrust.

8. In a friction transmission, a torque loading device comprising two coaxial torque loading members movable relatively to each other, a plurality of conoidal shaped rollers interposed between said members, at least one of said members having helical surfaces contacting each of said conoidal rollers individually in elliptical contact areas that are inclined with respect to the axis of rotation of the individual roller whereby each roller individually sustains a thrust in the direction of said axis in proportion to the torque transmitted by each roller, and means mutually balancing the thrusts of all rollers for equalizing the distribution of torque and load between all of said rollers.

9. In a friction transmission system, a torque loading device comprising two torque loading members movable relatively to each other, at least one of said members being provided with several helical surfaces, a plurality of conoidal rollers interposed between said members and contacting the helical surfaces of said members in elliptical contact areas inclined with respect to axis of rotation of each respective roller whereby said torque loading members are capable of slight rocking movements relative to each other while maintaining the load carrying capacity of the torque loading device.

10. In a friction transmission system, a torque loading device comprising two torque loading members movable relatively to each other, conoidal rollers interposed between said members, at least one of said members having a curved surface contacting said rollers, the radial profile of said curved surface being substantially a circular arc with its center upon the axis of the torque loading device whereby said two members are capable of rocking movements relative to each other without affecting the load carrying capacity of the torque loading device.

11. In a torque loading device for a friction transmission, the combination of two coaxial torque loading members movable relatively to each other, conoidal shaped rollers interposed between said members, said members being provided with surfaces contacting with said conoidal shaped rollers, at least one of said members having its respective contacting surfaces of wedge formation to cooperate with said conoidal shaped rollers, the said contact surfaces being inclined towards each other relative to the axes of rotation of said conoidal rollers whereby pressure of said contacting surfaces upon said conoidal shaped rollers tends to cause a radial movement of said rollers relative to said torque loading members, and means to resist said radial movement of said conoidal shaped rollers relative to each other, said means being capable of radial movement relatively to said torque loading members.

12. In a torque loading device for a friction transmission, the combination of two coaxial torque loading members movable relatively to each other, conoidal shaped rollers being spaced symmetrically around the axis of said members and being interposed between said members, said members being provided with surfaces contacting with said conoidal shaped rollers, at least one of said members having its respective contacting surface of wedge formation to cooperate with said conoidal shaped rollers, the said contact surfaces being inclined towards each other relative to the axes of rotation of said conoidal rollers whereby pressure of said contacting surfaces upon said conoidal shaped rollers tends to cause a radial movement of said rollers relative to said torque loading members, and means common to all of said conoidal shaped rollers to resist radial movement of said conoidal shaped rollers relative to each other, said means being capable of radial movement relatively to said torque loading members to balance the opposed radial thrusts of said conoidal shaped rollers.

RICHARD ERBAN.